2 Sheets—Sheet 1.

J. A. PATTERSON & A. J. SPRAGUE.

TRUSS BRIDGE.

No. 7,282. Reissued Aug. 29, 1876.

WITNESSES:
Gustave Dieterich
Alex. F. Roberts

INVENTOR:
J. A. Patterson
A. J. Sprague.
BY Munn & Co
ATTORNEYS.

N. PETERS, PHOTO-LITHOGRAPHER, WASHINGTON, D. C.

2 Sheets—Sheet 2.
J. A. PATTERSON & A. J. SPRAGUE.
TRUSS BRIDGE.
No. 7,282. Reissued Aug. 29, 1876.
Fig. 4.
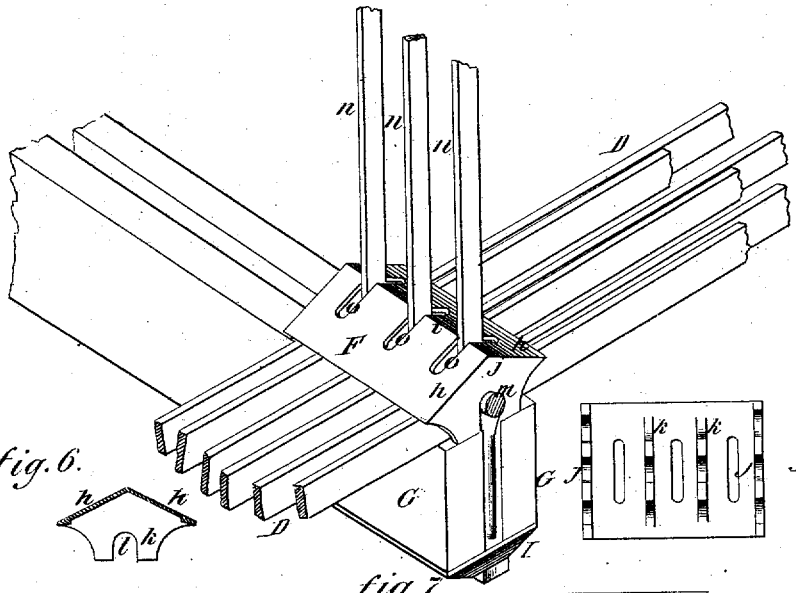
Fig. 6.
Fig. 5.
Fig. 7.
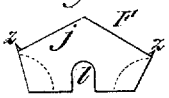
Fig. 8.
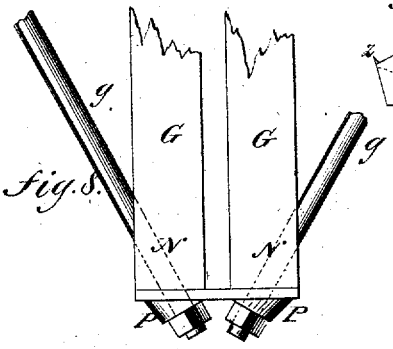
Fig. 10.
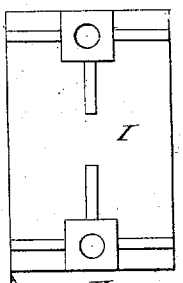
Fig. 11.
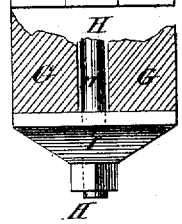
Fig. 9.
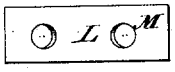
Fig. 13.
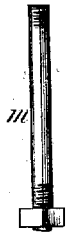
Fig. 12.
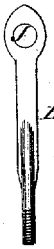
WITNESSES:
Thos. Ave Dieterich
Alex F. Roberts
INVENTOR:
J. A. Patterson
BY A. J. Sprague
Munn & Co
ATTORNEYS.
N. PETERS, PHOTO-LITHOGRAPHER, WASHINGTON, D. C.

UNITED STATES PATENT OFFICE.

JOHN A. PATTERSON AND ANDREW J. SPRAGUE, OF TOLEDO, OHIO.

IMPROVEMENT IN TRUSS-BRIDGES.

Specification forming part of Letters Patent No. 146,400, dated January 13, 1874; reissue No. 7,282, dated August 29, 1876; application filed July 31, 1876.

*To all whom it may concern:*

Be it known that we, JOHN AUSTIN PATTERSON and ANDREW J. SPRAGUE, of Toledo, in the county of Lucas and State of Ohio, have invented a new and Improved Truss-Bridge, of which the following is a specification:

Our invention relates to truss-bridges of the kind known as the "Howe truss-bridge;" and it consists of the modifications and improvements in the construction and arrangements of some of the more essential parts, so as to permit the use of an iron bottom chord, with pin-connection to the suspending-rods, which we will proceed to describe, referring to the accompanying drawings, in which—

Figure 1:
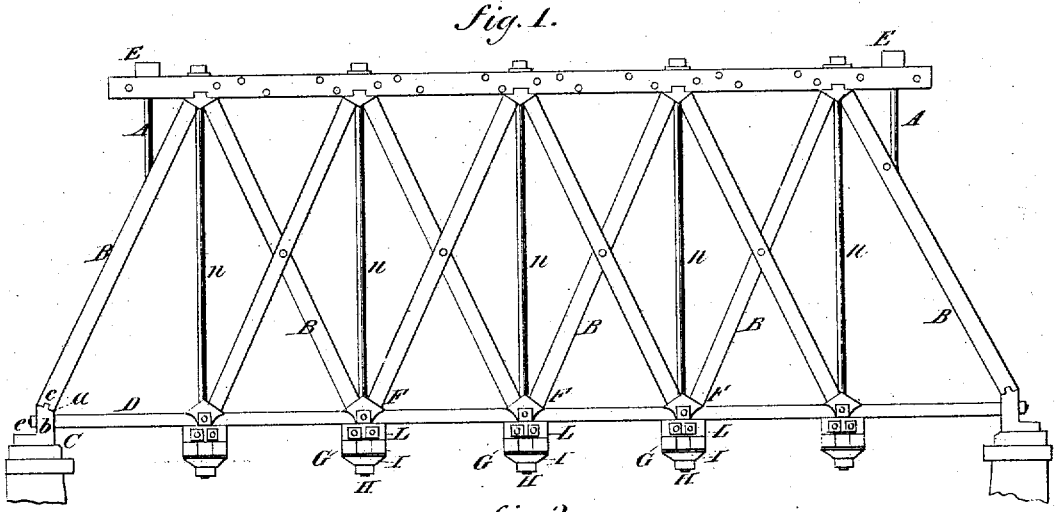
Figure 2:
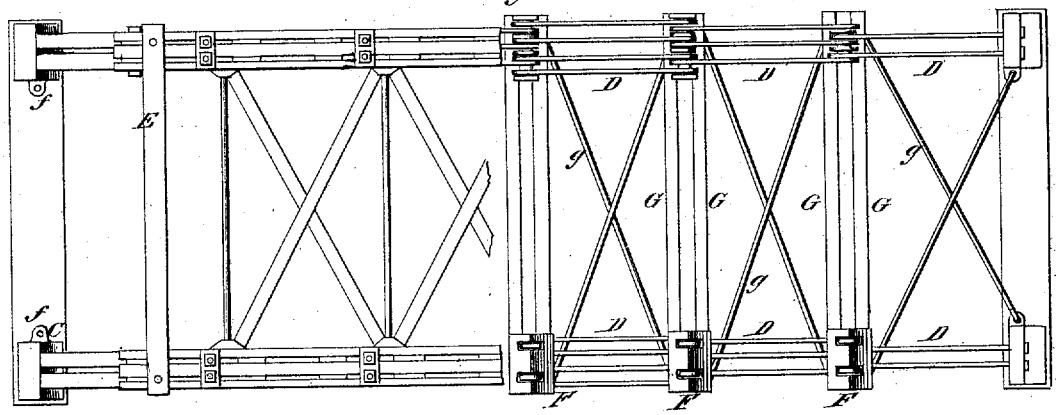
Figure 3:
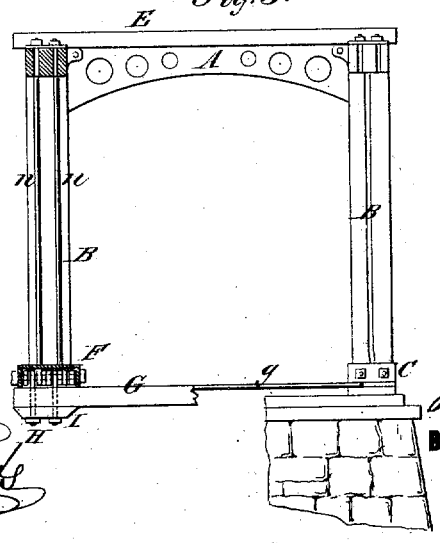

Figure 1 is a side elevation of our improved bridge. Fig. 2 is partly a plan view and partly a horizontal section. Fig. 3 is partly a sectional view and partly an end elevation. Fig. 4 is a perspective view of a section of floor-beams, lower chord, suspension-rods, and the angle-block for the support of the diagonal braces. Fig. 5 is a plan of the under side of the angle-block. Fig. 6 is a section of said block. Fig. 7 is an end elevation of it. Fig. 8 is a plan of an end section of floor-beams, also the end plate and horizontal braces of the lower chord, showing the arrangement of the plate and braces. Fig. 9 is a front elevation of the plate for the connection of the said braces of the lower chord. Fig. 10 is a plan of the bottom of the shoe for supporting the floor-beams. Fig. 11 is a section of a pair of floor-beams, and side elevation of the shoe and suspending-rod. Fig. 12 is a side elevation of a rod for suspending the shoe; and Fig. 13 is a side elevation of the coupling-pin on which the angle-block is supported, and by which the links of the lower chord, the rods by which the lower chord is suspended from the upper one, and the floor-beam shoe-rods are connected.

Similar letters of reference indicate corresponding parts.

We propose to omit the end posts and pier-panels commonly employed at the ends, mainly for making a finish thereat, and for our finish we apply the metal façades A, of any ornamental construction, attaching them to the upper ends of the first diagonal braces B, and the beam E connecting the top chords. This relieves the pedestal-blocks C of the aforesaid end posts, so that we need only construct them with special reference to the foot-rests *a* for the braces B, the elevations *b* for the connection of the links D, and the ears *f* for the connection of the horizontal rods *g*, which connect and brace the lower chord. The angle-blocks F, for the foot-rests of the braces B, we make in the form of strong angle-plates *h*, united together at *i*, at the proper angle for being at right angles to the braces which rest on them, with end plates *j* and middle plates *k*, for strengthening them, projecting downward from the lower sides, to rest on the coupling-pin *m*, plates being slotted, as at *l*, to straddle the pin *m*, and also extended downward below it far enough to form support for top of floor-timbers G. Said coupling-pin *m* is suspended on the vertical suspending-rods *n*, which pass through slots *o* in the plates *h*. The plates *h* of the angle-block terminate at the lower edges sufficiently higher than the plane of the connecting-pin *m* to allow the links D of the lower chord to pass under them to the pin *m*, whereon they are connected. The blocks F may have a little flange, *z*, Fig. 7, to hold the braces B from slipping off. We also suspend the floor-timbers G from these coupling-pins *m* by short rods H and the foot-plates I, the rods having an eye, J, in the upper end, through which the pins *m* pass, and pass through the foot-plates at the lower end, and receive a nut by which to hold the plates.

To connect the horizontal brace-rods *g* of the lower chord to the floor-beams, we employ the flat wrought-iron plates L, with oblique holes M, and make holes N through the corners of the beams for the rods, as shown in Fig. 8, and employ bevel-washers P to seat the nuts on.

In making the angle-blocks we propose to cast the slots in the plates *j* and *k* on metal chills, to make them sufficiently smooth and true to give perfect bearing on pin *m* without fitting; but to avoid chilling them so hard as to make them liable to break, we propose to arrange the chills so as to be removed from the mold readily, as soon as the metal has hardened enough to retain its form.

Having thus described our invention, we claim as new and desire to secure by Letters Patent—

1. The pedestal-blocks C, constructed with the brace-rests *a*, the elevation *b*, for the connection of the chord-links, the ear *f*, and the base-plate *e*, all substantially as specified.

2. The angle-block F, consisting of plates *h*, end plates *j*, and middle plates *k*, the end and middle plates being slotted to straddle the connecting-pin, and the plates *h* slotted for the suspending-rods, substantially as specified.

3. The said angle-blocks, arranged to rest by slots in the plates *j* and *k* on the coupling-pin *m*, and admit the chord-links between plates *h* and the floor-beams, to connect with the pin *m*, substantially as specified.

4. The chord-links D, the angle-blocks F, and floor-beam suspenders H, suspended from the rods *n* by the pin *m*, substantially as specified.

5. The combination of the suspending-rods *n*, angle-plate F, pin *m*, and the chord-links D, substantially as specified.

6. The combination of the suspending-rods *n*, angle-blocks F, pin *m*, chord-links D, and the floor-beam G, substantially as specified.

7. The combination, in a truss-bridge, of the rods *n*, suspended from the top-chord angle-plate F, diagonal braces B, connecting-pin *m*, and the lower chord-links D, substantially as specified.

ANDREW J. SPRAGUE.
JOHN A. PATTERSON.

Witnesses:
E. S. HART,
B. B. HART.